March 3, 1942.    E. N. HAGUE    2,275,178
TREATMENT OF HYDROCARBONS
Filed May 11, 1939
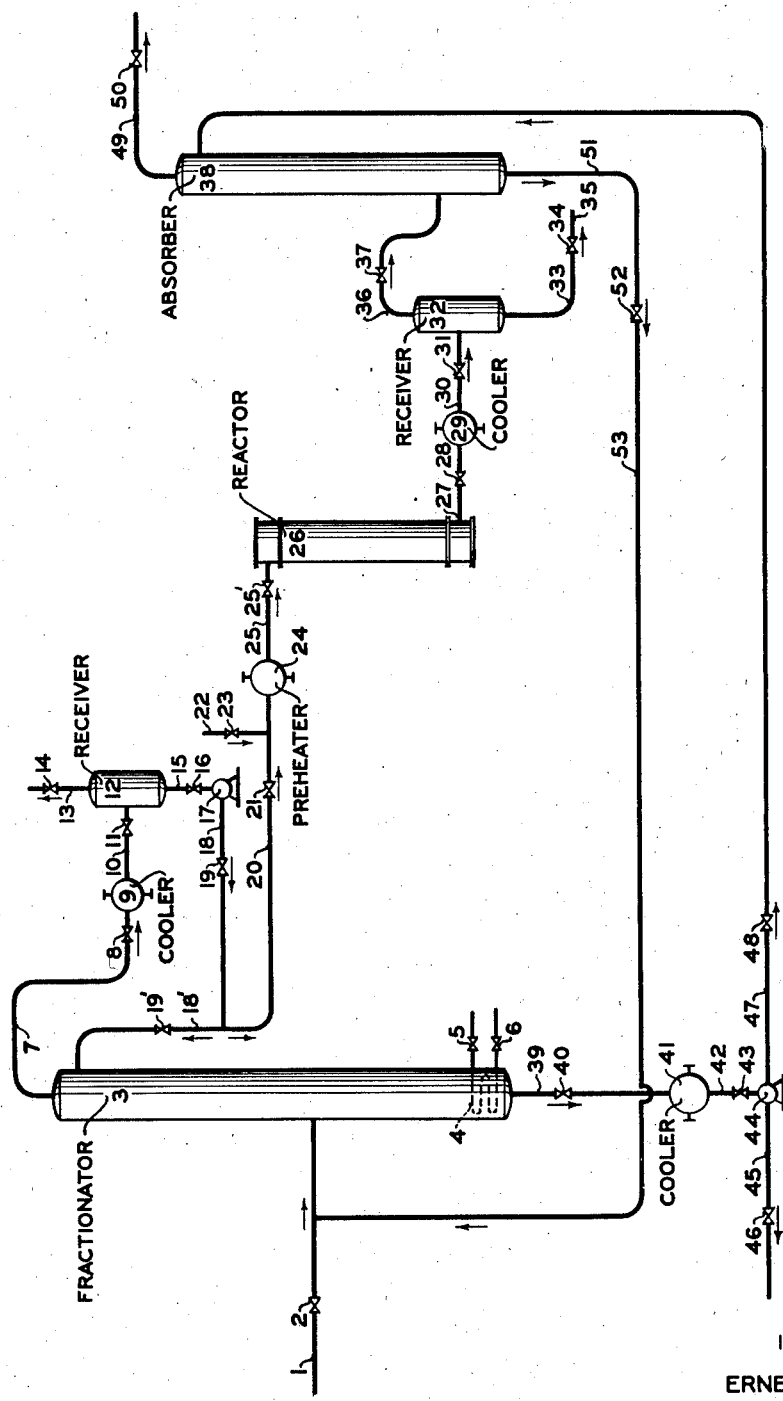
INVENTOR
ERNEST N. HAGUE
BY *Lee J Gary*
ATTORNEY Patented Mar. 3, 1942

2,275,178

UNITED STATES PATENT OFFICE 2,275,178

TREATMENT OF HYDROCARBONS

Ernest N. Hague, Chicago, Ill., assignor to Universal Oil Products Company, Chicago, Ill., a corporation of Delaware Application May 11, 1939, Serial No. 272,935

5 Claims. (Cl. 183—115)

This invention relates to the production of aviation gasoline by the hydrogenation of olefin polymers. More specifically it is concerned with an improved method of recovering octane vapors contained in the excess of the hydrogen-containing gas used in hydrogenation of octenes to octanes, consisting mainly of a mixture of branched chain isomers.

In one specific embodiment the present invention comprises a process of recovering iso-octane from the excess of hydrogen-containing gas used in hydrogenating iso-octenes to iso-octanes, which comprises contacting said excess gas containing iso-octane vapors with a butene trimer absorption oil and distilling the used absorption oil to separate therefrom the absorbed iso-octane.

Although the process of this invention may be carried out alternatively by a number of arrangements of apparatus, for the purpose of illustrating characteristic equipment in which the process may be conducted, the attached drawing has been provided which shows diagrammatically by the use of conventional figures an arrangement of inter-connected units in which the process may be effected continuously. It is understood that minor features of the apparatus construction may be modified without departing essentially from the broad scope of the invention.

Referring to the drawing, a polymer fraction substantially free from 4-carbon atom hydrocarbons is withdrawn from the stabilized polymer receiver of a polymerization plant by a pump, not shown, and is introduced continuously through line 1, containing valve 2, and discharged into fractionator 3, operating conveniently under a pressure of approximately 5–10 pounds per square inch, with a top temperature of 250° F. and a bottom temperature of 375° F. maintained, for example, by indirect heating by steam in internal reboiler coil 4 provided with valves 5 and 6. The reboiler may consist also of an external reboiler of suitable design. The octene content of the polymer is separated from the trimers and higher boiling polymers in fractionator 3 and is passed overhead through line 7, containing valve 8, to cooler 9 from which it is conducted through line 10, containing valve 11, and discharged into iso-octene receiver 12, equipped with a conventional gas release line 13, containing valve 14. Hereafter in this specification and in the claims the term "trimer" is used in referring to the portion of butene polymer products boiling higher than octenes. Such polymers may be derived from iso-butene, n-butenes, or from mixtures of iso-butene and n-butenes. In general, butene trimers and other polymers suitable as absorption oil boil in the approximate range of 300–400° F.

From the bottom of receiver 12, iso-octene is conducted through line 15, containing valve 16, to pump 17 which discharges into line 18, containing valve 19. A portion of the iso-octene discharging from line 18 is passed through line 18', containing valve 19', to the top of fractionator 3 to assist in controlling the temperatures therein. The major portion of the iso-octene fraction emerging from line 18 is conducted through line 20, containing valve 21, in which it is commingled with hydrogen admitted under pressure from an outside source through line 22, containing valve 23, after which the commingled mixture of hydrogen and iso-octene passes through pre-heater 24 and line 25, containing valve 25' to hydrogenator 26, which may consist of a catalyst chamber of appropriate design or a plurality of such chambers maintained under a pressure of approximately 100–200 pounds per square inch at a hydrogenation temperature in the range of 300–450° F., and containing a hydrogenation catalyst.

Suitable hydrogenation catalysts are well represented by reduced nickel which is used effectively on supports or spacing materials, such as diatomaceous earth, alumina, etc. Other hydrogenation catalysts comprise other members of the iron group and of the platinum group and include the oxides and sulfides of nickel, iron, and cobalt; and, also, oxides and sulfides of chromium and molybdenum.

Hydrogenation products, including the excess of hydrogen-containing gas, are conducted from hydrogenator 26 through line 27, containing valve 28, are passed through cooler 29 to line 30, containing valve 31, and are discharged therefrom into receiver 32 in which a major portion of the iso-octane is separated as liquid under approximately 50 pounds pressure from the excess of hydrogen-containing gas. The amount of iso-octane remaining as vapor in this excess of hydrogen-containing gas will be dependent upon the temperature of receiver 32 which may vary with climatic conditions from probably less than 0° F. to as high as approximately 150° F. The application of this invention is accordingly more necessary and advantageous in a hot climate. From the bottom of iso-octane receiver 32 the iso-octane is withdrawn through line 33, containing control valve 34, and is passed through line 35 to storage.

The hydrogen-containing gas discharges continuously from receiver 32 through line 36, containing valve 37, and passes to absorber 38 which may comprise a vertical, packed chamber in which the hydrogen-containing gas is contacted under a pressure in the range of atmospheric to approximately 100 pounds per square inch with an absorption oil consisting of a portion of the trimer fraction separated as bottoms from the octenes in fractionator 3. Since the operating temperature of absorber 38 is dependent largely upon climatic conditions, this temperature, under some circumstances, may be as high as 150° F. To offset decreased absorption due to such high temperature, the rate of flow of absorption oil is increased so as to obtain efficient removal of iso-octane from the excess of hydrogen-containing gas.

As the octenes are distilled overhead in fractionator 3, trimers and higher boiling polymers are removed from the bottom of fractionator 3 through line 39, containing valve 40, and are passed thence through cooler 41, line 42, and valve 43 to pump 44, which may discharge said trimers through line 45, containing valve 46, and to storage. In accordance with the present invention a portion of the trimer fraction being discharged by pump 44 may be passed through line 47 and valve 48 to the top of absorber column 38 in which this trimer absorption oil flows downwardly counter-current to the ascending effluent stream of hydrogen-containing gas, the unabsorbed gases from which discharge continuously from absorber 38 through line 49, and pressure release valve 50 to storage, or to further use, as in recycling to further contact with iso-octenes in hydrogenator 26.

Trimer absorption oil containing absorbed iso-octane is withdrawn continuously from absorber 38 through line 51, equipped with level control valve 52, and is next passed through line 53 into line 1 and thence to fractionator 3 in which it is mixed with the main polymer product undergoing fractional distillation. The iso-octane so recovered from the effluent hydrogen-containing gas distills from fractionator 3 in admixture with the iso-actene, which later passes to hydrogenator 26, while the trimer absorption oil mixes with the heavy polymers most of which mixture is withdrawn through line 45 and valve 46 to storage and a part is conducted back to absorber 38 for use is the recovery of iso-octane from the hydrogen-containing gas stream entering said absorber.

The following example is introduced to show results obtainable in the operation of the process, although these data are not presented with the intention of limiting unduly the broad scope of the invention:

A daily production of 290 barrels of stabilized polymers obtained from the polymerization of butenes from a butane-butene mixture in the presence of a granular phosphoric acid-containing catalyst was conducted to a fractionating column operating under a pressure of 10 pounds per square inch with a top temperature of 250° F. and a bottom temperature of 375° F. The 264 barrels per day of iso-octenes so obtained were contacted with two molecular proportions of a gas containing 88% hydrogen, 9% methane, and 3% of higher hydrocarbons at 350° F. under 150–200 pounds pressure in a chamber containing a pelleted mixture consisting of reduced nickel and diatomaceous earth.

After cooling to 85° F. and removal under 50 pounds pressure of the so formed 272 barrels per day of iso-octane, the effluent hydrogen-containing gas, corresponding to 159,000 cubic feet per day, was contacted in a vertical, packed column at 90–95° F., also under 50 pounds pressure, with a portion of the trimer fraction withdrawn as a residue from the primary fractional distillation of the total polymer product obtained in the polymerization of butenes. The use of 6 barrels of trimer fraction per day in this absorption treatment recovered from the effluent hydrogen-containing gas, 2 to 3 barrels per day of iso-octane, a quantity representing about 1% of the total iso-octane production.

The yield of iso-octane was thus increased to 275 barrels per day, while a total of 26 barrels of trimer fraction was conducted to storage daily.

The nature of the present invention and its practical application are evident from the preceding specification and illustrated data presented, although neither section is intended to limit unduly its generally broad scope.

I claim as my invention:

1. A process for recovering iso-octane from excess hydrogen-containing gas used in the hydrogenation of iso-octenes to iso-octanes which comprises contacting said excess gas containing iso-octane vapors with an absorption oil comprising polymers boiling in the approximate range of 300–400° F., and subjecting said used absorption oil to distillation to separate therefrom absorbed iso-octane.

2. A process for recovering iso-octane from excess hydrogen-containing gas used in the hydrogenation of iso-octenes to iso-octanes which comprises contacting said excess gas containing iso-octane vapors with an absorption oil comprising essentially butene trimers and subjecting said used absorption oil to distillation to separate therefrom absorbed iso-octane.

3. In a continuous process wherein butene polymers are fractionally distilled through a polymer distilling column and separated into dimers and trimers, and the dimers are catalytically hydrogenated in the presence of an excess of a hydrogen-containing gas to produce iso-octanes which are liquefied, collected and separated from the effluent hydrogen-containing gas substantially saturated at the receiver temperature with iso-octane vapors; the improvement which comprises continuously contacting said gas containing iso-octane vapors with a portion of the trimer fraction in an absorber, continuously conducting said trimer fraction and absorbed iso-octanes from the absorber to the polymer distilling column wherein the iso-octanes absorbed by the trimer fraction and the dimer polymer fraction are distilled overhead in admixture, and subjecting the dimers in admixture with the iso-octanes to hydrogenation.

4. In a continuous process wherein butene polymers are fractionally distilled through a polymer distilling column and separated into dimers and higher boiling polymers consisting mainly of trimers, and the dimers are catalytically hydrogenated in the presence of an excess of a hydrogen-containing gas to produce iso-octanes which are liquefied, collected in a receiver and therein separated from the effluent excess of hydrogen-containing gas, substantially saturated at the receiver temperature with iso-octane vapors; the improvement which comprises subjecting said gas containing iso-octane vapors to continuous countercurrent contact with a portion of the trimer fraction in a vertical absorber column, continuously conducting said trimer fraction and absorbed iso-octanes from the absorber column to the polymer distilling column wherein the iso-octanes absorbed by the trimer fraction and the dimer polymer fraction are distilled overhead in admixture, and subjecting the dimers in admixture with the iso-octanes to hydrogenation.

5. In a continuous process wherein butene polymers are fractionally distilled through a polymer distilling column and separated into dimers and trimers, and the dimers are catalytically hydrogenated in the presence of an excess of a hydrogen-containing gas to produce iso-octanes which are liquefied, collected and separated from the effluent hydrogen-containing gas substantially saturated at the receiver temperature with iso-octane vapors; the improvement which comprises continuously contacting said gas containing iso-octane vapors with a polymer fraction boiling in the approximate range of 300–400° F. in an absorber, continuously conducting said polymer fraction and absorbed iso-octanes from the absorber to the polymer distilling column wherein the iso-octanes absorbed by the polymer fraction and the dimer polymer fraction are distilled overhead in admixture, and subjecting the dimers in admixture with the iso-octanes to hydrogenation.

ERNEST N. HAGUE.